United States Patent [19]

Ishida et al.

[11] 4,114,981
[45] Sep. 19, 1978

[54] OPTICAL FIBER FOR COMMUNICATION

[75] Inventors: Yukinori Ishida, Mito; Moriaki Kojima, Yachiyo; Toshiaki Kobayashi, Chiba; Yasuyuki Sugawara, Sakura, all of Japan

[73] Assignees: Nippon Telegraph and Telephone Public Corporation; The Fujikura Cable Works, Ltd., both of Japan

[21] Appl. No.: 797,389

[22] Filed: May 16, 1977

[30] Foreign Application Priority Data

May 26, 1976 [JP] Japan .................. 51-61017

[51] Int. Cl.² ............................................. G02B 5/14
[52] U.S. Cl. ............................................. 350/96.33
[58] Field of Search ............... 350/96.33, 96.30, 96.23

[56] References Cited

U.S. PATENT DOCUMENTS

| | | | |
|---|---|---|---|
| 3,853,384 | 12/1974 | Pinnow et al. | 350/96.33 |
| 3,980,390 | 9/1976 | Yamamoto et al. | 350/96.33 |
| 4,072,400 | 2/1978 | Claypoole et al. | 250/96.33 |

*Primary Examiner*—John K. Corbin
*Assistant Examiner*—Stewart Levy
*Attorney, Agent, or Firm*—Charles W. Helzer

[57] ABSTRACT

An optical fiber for communication comprises an optical fiber covered with a coating of a high-molecular elastomer having a flexural modulus of not less than 200 kg/cm² at room temperature, the difference between the flexural moduli of said elastomer at room temperature and about $-50°$ C being not more than 1000 kg/cm².

4 Claims, 2 Drawing Figures

OPTICAL FIBER FOR COMMUNICATION

BACKGROUND OF THE INVENTION

This invention relates to an optical fiber for communication, and more particularly, to an optical fiber for communication in which an optical fiber is reinforced by coating a high-molecular material thereon.

Previously used optical fiber for communication have an optical fiber which basically consists of a core and a surrounding cladding each made of a material having different refractive index. The difference of refractive index ensures optical transmission. Such optical fibers are, however, mechanically fragile. To provide structural strength, optical fibers are usually covered with a coating of material having relatively high hardness and flexural modulus, such as nylon, polyvinyl formal (PVF), fluoroethylenepropylene copolymers (FEP), polyethylene (PE) or the like. With respect to techniques for coating optical fibers, reference is made to the article "Loss in coated optical fibers" by K. Ishida et. al., 1975 National Convention of the Japanese Electronic Communication Society, Lecture Papers, Part 4, page 927, March, 1975.

The recent advance in technique for manufacturing optical fibers made it possible to increase the strength of a fiber itself. The function of a coating to reinforce an optical fiber became less important. In other words, coating materials which have lower hardness and flexural modulus than the conventional ones are satisfactory as a reinforcement.

Improvements were also made in the transmission loss of optical fibers. It was found that coating causes to increase the transmission loss of optical fibers. The higher the hardness and flexural modulus of a coating material are, the more the transmission loss are increased. Provided that the same coating material is used, the transmission loss are more increased as the temperature is lower. With such increase of transmission loss, repeater spacing is shortened and signal-to-noise ratio is increased so that severer requirements are imposed on the design of peripheral equipment. Various problems are encountered in practice. Generally, it is necessary to maintain transmission loss to at most about 5 dB per kilometer and an increase in transmission loss resulting from the temperature variation from 20° C. to −50° C. to about 2 dB per kilometer to prevent undesired problems from occurring.

The inventors have made an analysis on the above problems.

The reason why the coating of optical fibers increases transmission loss is explained below.

Usually, an optical fiber is provided with a coating by extrusion. The extruded coating shrinks in both the radial and longitudinal directions of the optical fiber when it solidifies.

The radial shrinkage of the coating exerts edgewise pressure to the optical fiber. The interface between the extruded coating and the optical fiber is not always uniform due to the presence of very fine dirt particles attached on the surface of the optical fiber before the coating or foams generated in the coating material as a result of foaming phenomenon. With the interface irregular, the edgewise pressure caused by the radial shrinkage of the coating material may not be uniformly applied to the optical fiber. As a result, the optical fiber is subject to microbending from which light leaks outside.

The longitudinal shrinkage of the coating material exerts shear stress at the interface between the optical fiber and the coating material, which causes to increase the density of a cladding portion of the optical fiber. The refractive index of the cladding portion is correspondingly increased so that the refractive index of the core relative to the cladding in the optical fiber may be varied. This also causes light to leak. It has thus been found that the increase of transmission loss associated with the coating of the optical fiber results from the shrinkage of the coating material upon solidification.

The second is the phenomenon that the transmission loss of an optical fiber are more increased as the hardness and flexural modulus of a coating material are higher. This will be explained as follows.

The coating material which has higher hardness and flexural modulus shows a higher rate of shrinkage, which increases the edgewise pressure to the optical fiber. As a result, microbending loss is increased.

The third is the phenomenon that the coated optical fiber shows an increase in transmission loss as the temperature decreases. This will be apparent from the fact that the rate of shrinkage of the coating material depens on the surrounding temperature.

SUMMARY OF THE INVENTION

Accordingly, the primary object of this invention is to provide an optical fiber for communication reinforced with a coating material so as not to increase its transmission loss under severe installation conditions, for example, in extremely cold areas, as well as at room temperature.

The above and other objects of this invention can be achieved by providing an optical fiber for communication comprising an optical fiber covered with a coating of a high-molecular elastomer having a flexural modulus of not less than 200 kg/cm$^2$ at room temperature, the difference between the flexural moduli of said elastomer at room temperature and about −50° C. being not more than 1000 kg/cm$^2$.

DETAILED DESCRIPTION OF THE PREFERRED EMBODIMENTS

The inventors have conducted a number of experiments using various high-molecular materials to find the best way for reducing the microbending loss generated when an optical fiber is provided with a coating. Since the hardness and flexural modulus of material vary in an associated relation, it is possible to select only the flexural modulus as a parameter. It has been found that the microbending loss can be suppressed to practically allowable level if the flexural modulus of a coating material is 200 kg/cm$^2$ or more and the difference between the flexural moduli at room temperature and about −50° C. is 1000 kg/cm$^2$ or more. Coating materials having a flexural modulus of less than 200 kg/cm$^2$ at room temperature have only a restricted reinforcing function and are easily damaged. The coating is partly stripped from damaged regions and the optical fiber may be ruptured when external force is applied. When the difference between the flexural moduli at room temperature and about $-50°$ C. is more than 1000 kg/cm$^2$, the coating material has an increased flexural modulus at low temperatures so that a substantial microbending loss may develop. It is to be noted that the temperature of about $-50°$ C. is used because it is regraded as the lowest temperature limit at any area on the earth where optical fibers will be actually installed.

The coating made of high-molecular materials having a flexural modulus within the above-defined range can provide the optical fiber with the required structural strength and reduce the microbending loss not only at room temperature, but also at low temperatures. As a result, an increase of transmission loss due to temperature variation within the range from 20° C. to 50° C. can be suppressed to a practically allowable level in the order of 2 dB per kilometer.

The invention is further illustrated by the following examples.

EXAMPLE 1

Figure 1:
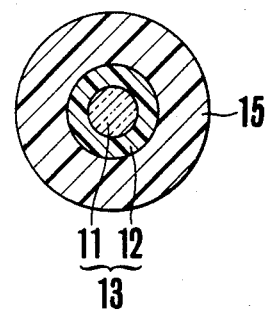
FIG. 1 is a cross-sectional view of an embodiment of the optical fiber for communication according to the invention.

Referring to FIG. 1, a core 11 made of quartz glass having a diameter of 150 μm is enclosed by a cladding 12 made of Silicone KE 103 (trade mark, manufactured and sold by Shinetsu Chemical Industry Co., Ltd.) having a thickness of 100 μm to form a silicone cladded fiber 13. Five fibers are prepared. One of these is designated Sample I. Each of the remaining four cladded fibers 13 is covered with a cylindrical coating 15 having a thickness of 350 μm. Samples having coatings made of Nylon 12 (trade mark, Daicel Ltd.), Hytrel No. 4055 (trade mark, E. I. duPont de Nemours & Co., Inc.), Silicone KE 151u (trade mark, Shinetsu Chemical). and Hytrel No. 5550 (trade mark, E. I. duPont) are designated Samples II, III, IV, and V, respectively.

Physical properties of Samples I-V are measured at temperatures of 20° C. and $-50°$ C., obtaining date shown in Table 1. The data of flexural modulus (kg/cm$^2$) and hardness (Shore A, D and Rockwell R) in Table 1 are those of the respective coating materials for Samples II-V, while those of Silicone KE 103 which forms a cladding of fiber are shown for Sample I as reference.

Table 1

| | Temp. (° C) | Sample I Silicone KE 103 | Sample II Nylon 12 | Sample III Hytrel #4055 | Sample IV Silicone KE 151u | Sample V Hytrel #5550 |
|---|---|---|---|---|---|---|
| Hardness (Shore A, D; Rockwell R) | 20 | 20A | R106 | 42D(92A) | 27D(50A) | 60D |
| | −50 | 22A | — | 43D | 27D | 72D |
| Flexural modulus (kg/cm$^2$) | 20 | 30 | 15000 | 500 | 300 | 2100 |
| | −50 | 32 | 50000 | 700 | 500 | 4000 |
| Transmission loss at wave length 0.85μm (dB/km) | 20 | 4 | 7 – 8 | 4 | 4 – 4.5 | 5.5 |
| | −50 | 5 | 12 – 14 | 5 – 6 | 5– 6.5 | ≧50 |
| Increase of loss (dB/km) | 20 to −50 | 1 | 5 – 6 | 1 – 2 | 1 – 2 | ≧44.5 |

As seen from Table 1, the transmission loss of Sample II at room temperature (20° C.) which is a conventional optical fiber having the coating 15 of Nylon 12 is 2-4 dB/km larger than that of Sample I which is an optical fiber having no coating. The increase of transmission loss from 20° C. to $-50°$ C. is 5-6 dB/km in Sample II, which value is considerably larger than 1 dB/km obtained in Sample I. It is understood that Sample II is unsuitable for use in extremely cold areas. In the case of Sample V, the transmission loss at 20° C. does not show a significant difference in comparison with that of Sample I so that it may be suitable for use under normal conditions. However, the increase of transmission loss from 20° C. to $-50°$ C. is as large as 44.5 dB/km. Sample V is also unsuitable for use under installation conditions in extremely cold areas.

On the other hand, Samples III and IV which are optical fibers having coatings of Hytrel 4055 and Silicone KE 151u according to the invention show transmission losses at 20° C. and $-50°$ C. which are equal or substantially equal to those of Sample I which is an optical fiber having no coating. The increases of transmission loss are also substantially equal to that of Sample I and very small. Samples III and IV can be satisfactorily used even at low temperatures irrespective of installation conditions.

EXAMPLE 2

Figure 2:
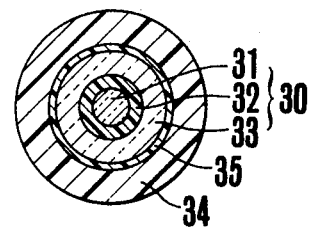
FIG. 2 is a similar cross-sectional view of another embodiment of the optical fiber for communication according to the invention.

In the Example, a step index type optical fiber 30 shown in FIG. 2 is prepared by a conventional chemical vapor deposition (CVD) method. The optical fiber 30 comprises a solid core 31, a cylindrical cladding 32, and a cylindrical jacket 33 radially laminated one on the other. The composition and diameter of the optical fiber 30 are shown in Table 2.

Table 2

| | Composition | Diameter (μm) |
|---|---|---|
| Core 31 | P$_2$O$_5$—SiO$_2$ | 60 |
| Cladding 32 | B$_2$O$_3$—SiO$_2$ | 90 |
| Jacket 33 | SiO$_2$(quartz) | 150 |
| Relative refractive index* | 0.007 (0.7%) | |

*The relative refractive index is represented by the equation $(n_1 - n_2)/n_1$ wherein $n_1$ is the refractive index of core and $n_2$ is that of cladding.

With respect to the CVD method employed herein, reference is made to, for instance, Robert D. Maurer, U.S. Pat. No. 3,737,293.

The optical fiber 30 described above is then provided with a primary coating 35 by applying a thermoplastic resin such as polyurethane or epoxy resin to a thickness of about 5 μm. Thereafter, a coating 34 is provided on the fiber 30 over the primary coating 35. The primary coating 35 serves to protect the jacket 33 from any scratch and is applied immediately after the fiber 30 having a core-cladding-jacket structure is prepared by the CVD method.

Four fibers are prepared and covered with coatings of Nylon 12, Hytrel No. 4055, Silicone KE 151u, and Hytrel No. 5550 having a thickness of 150 μm, which are designated Samples II', III', IV', and V', respectively.

Physical properties of Samples II' to V' were measured at temperatures of 20° C. and $-50°$ C., obtaining data shown in Table 3.

Table 3

| | Temp. (° C) | Sample II' Nylon 12 | Sample III' Hytrel #4055 | Sample IV' Silicone KE 151u | Sample V' Hytrel #5550 |
|---|---|---|---|---|---|
| Transmission loss at wave length 0.85μm (dB/km) | 20 | 2 | 2 | 2 | 2 |
| | −50 | 5 | 2.5 | 2.5 | 4 |
| Increase of loss | 20 to | 3 | 0.5 | 0.5 | 2 |

Table 3-continued

|  | Sample | | | |
|---|---|---|---|---|
| Temp. (° C) | II' Nylon 12 | III' Hytrel #4055 | IV' Silicone KE 151u | V' Hytrel #5550 |
| (dB/km) −50 | | | | |

As seen from Table 3, although the transmission loss at room temperature shows no significant difference for all Samples, the increase of transmission loss from room temperature to a low temperature of −50° C. is 0.5 dB/km both in Samples III' and IV' which value is 5 to 6 times smaller than those of Samples II' and V'.

EXAMPLE 3

In this Example, a graded index type optical fiber which has substantially the same cross section as in FIG. 2 is prepared by the CVD method. This graded index type fiber is different from the step index type fiber of Example 2 in that refractive index is graded in the radial direction of the core. The composition and diameter of the graded index type optical fiber are shown in Table 4.

Table 4

|  | Composition | Diameter (μm) |
|---|---|---|
| Core 31 | $GeO_2$—$B_2O_3$—$SiO_2$ | 60 |
| Cladding 32 | $B_2O_3$—$SiO_2$ | 84 |
| Jacket 33 | $SiO_2$ (quartz) | 150 |
| Relative refractive index(core-cladding) | 0.01 (1.0%) | |
| Parameter α | 2.0 ± 1 | |

Parameter α represents the distribution of refractive index varying from the core center toward peripheral direction and is defined in the article "Multimode Theory of Graded Core Fibers" by D. Gloge and E.A.J. Marcatili, the Bell System Technical Journal, Vol. 52, No. 9, pages 1563-1578, November, 1973. A method of forming a graded index type optical communication fiber is disclosed in, for example, Peter C. Schults, U.S. Pat. No. 3,826,560. As in Example 2, the optical fiber is provided with a primary coating of a thermoplastic resin such as polyurethane or epoxy resin having a thickness of 5 μm before it is covered with a coating.

Four fibers are prepared and covered with coatings of Nylon 12, Hytrel No 4055, Silicone KE 151u, and Hytrel No. 5550 having a thickness of 150 μm, which are designated Samples II", III", IV", and V", respectively.

Physical properties of Samples II" to V" are measured at temperatures of 20° C. and −50° C., obtaining data shown in Table 5.

Table 5

|  |  | Sample | | | |
|---|---|---|---|---|---|
|  | Temp. (° C) | II" Nylon 12 | III" Hytrel #4055 | IV" Silicone KE 151u | V" Hytrel #5550 |
| Transmission loss at wave length 0.85μm (dB/km) | 20 | 3.5 | 3.5 | 3.5 | 3.5 |
|  | −50 | 8.5 | 4 | 4 | 6 |
| Increase of loss (dB/km) | 20 to −50 | 5 | 0.5 | 0.5 | 2.5 |

As seen from Table 5, although the transmission loss at room temperature shows no significant difference for all Samples, the increase of transmission loss from 20° C. to −50° C. is 0.5 dB/km both in Samples III" and IV", which value reveals that coatings made of Hytrel No. 4055 and Silicone KE 151u according to the invention are quite satisfactory at low temperatures as well as at room temperature. On the contrary, Samples II" and V" which have coatings of Nylon 12 and Hytrel No. 5550, respectively, show undesired increases of transmission loss from 20° C. to −50° as large as 5 and 2.5 dB/km. Samples II" and V" are unsuitable for use under cold conditions.

What is claimed is:

1. An optical fiber for communication comprising an optical fiber covered with a coating of a high-molecular elastomer having a flexural modulus of not less than 200 kg/cm² at room temperature, the difference between the flexural moduli of said elastomer at room temperature and about −50° C. being not more than 1000 kg/cm².

2. The fiber as set forth in claim 1 wherein said optical fiber comprises a core and a cladding provided thereon.

3. The fiber as set forth in claim 1 wherein said optical fiber comprises a core, a cladding provided on the core, and a jacket provided on the cladding.

4. The fiber as set forth in claim 3 wherein said optical fiber is of a step index type.

* * * * *